Figure 1:
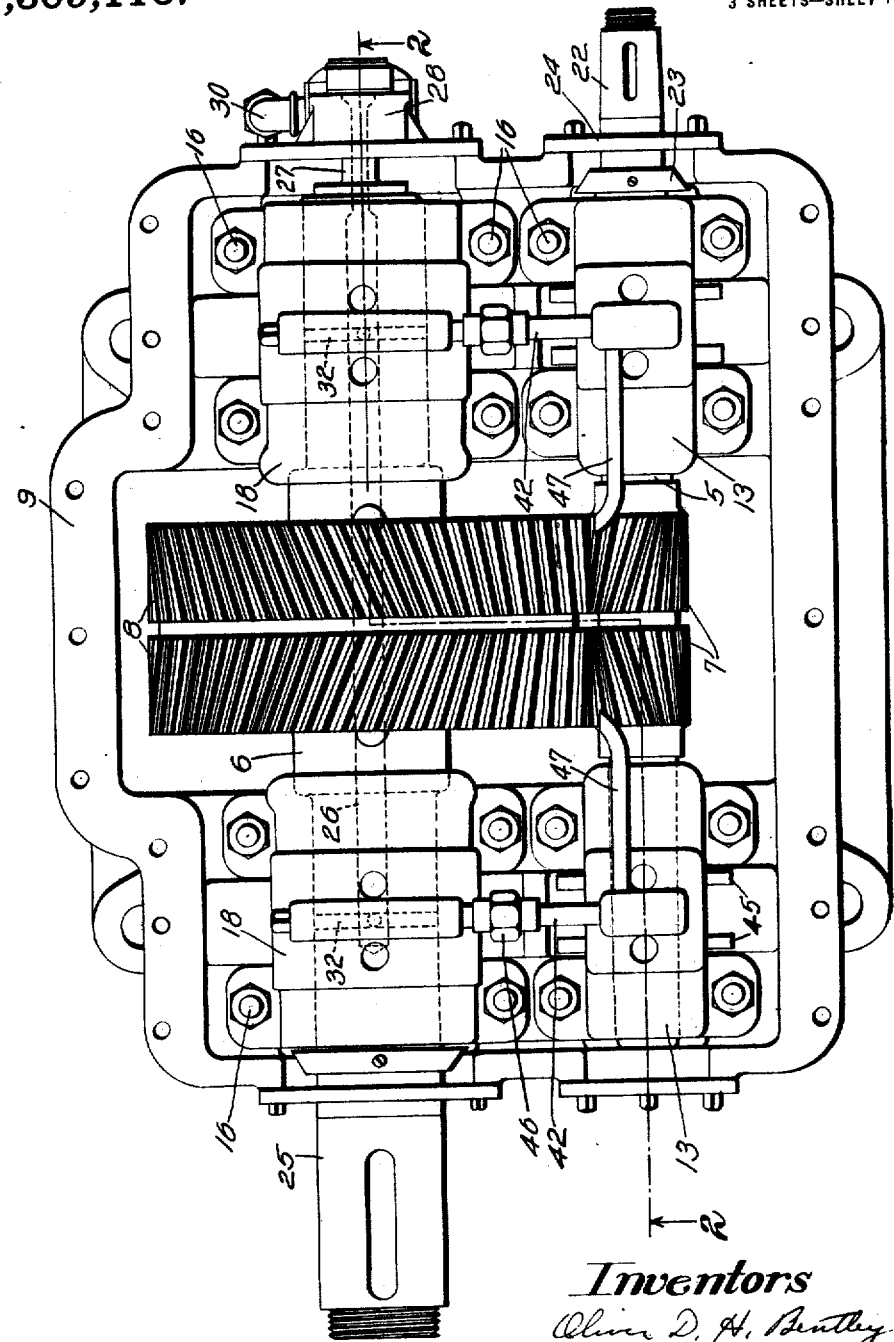

O. D. H. BENTLEY AND J. H. GIBBS.
GEARING.
APPLICATION FILED MAR. 1, 1917.

1,309,113.

Patented July 8, 1919.
3 SHEETS—SHEET 1.

Inventors
Oliver D. H. Bentley
John H. Gibbs
by their Attorneys
Van Everen Fish & Hildreth

O. D. H. BENTLEY AND J. H. GIBBS.
GEARING.
APPLICATION FILED MAR. 1, 1917.

1,309,113.

Patented July 8, 1919.
3 SHEETS—SHEET 3.

Inventors
Oliver D. H. Bentley
John H. Gibbs
by their Attorneys
Van Everen Fish & Hildreth

UNITED STATES PATENT OFFICE.

OLIVER D. H. BENTLEY, OF WEST ROXBURY, AND JOHN H. GIBBS, OF READVILLE, MASSACHUSETTS, ASSIGNORS TO B. F. STURTEVANT COMPANY, OF HYDE PARK, MASSACHUSETTS, A CORPORATION OF MASSACHUSETTS.

GEARING.

1,309,113.     Specification of Letters Patent.     Patented July 8, 1919.

Application filed March 1, 1917. Serial No. 151,693.

*To all whom it may concern:*

Be it known that we, OLIVER D. H. BENTLEY and JOHN H. GIBBS, citizens of the United States, residing, respectively, at West Roxbury and Readville, county of Suffolk, Commonwealth of Massachusetts, have invented certain new and useful Improvements in Gearing; and we do hereby declare the following to be a full, clear, and exact description of the invention, such as will enable others skilled in the art to which it appertains to make and use the same.

This invention relates particularly to gearing of the type employed in connection with steam-turbines, although it is applicable to gearings of other types employed for other purposes.

In gearings of the type in question, it is common to employ two parallel shafts supporting intermeshing toothed gear-wheels, and to mount these shafts in bearings in an oil-tight housing. Each shaft has an end projecting from the housing, the end of one shaft being connected with the turbine or other source of power, while the end of the other shaft is connected with the mechanism which is to be actuated by the turbine. Owing to the fact that such gearing is operated at high rotative speeds, accurate adjustment of the gear-wheels and close fitting of the shafts within their bearings are essential. For the latter purpose it has been common to employ split or divided bearings, of which the members may be adjusted together to take up wear, but the adjustment of the gears has depended upon the correct original location of the bearings, and means have not been provided for changing such adjustment in consequence of wear in the bearings.

One object of the present invention is to produce a gearing of the type in question, in which provision is made for the universal adjustment of the bearings of one or both of the gear-shafts, so that, regardless of wear in the bearings, or any inaccuracy in the construction of the parts, the shafts may be brought into true parallel position and correct distance apart under all conditions of use, while at the same time, provision is retained for the independent adjustment of each bearing to take up wear therein.

Another object of the invention is to provide gearing of the type in question with simple and reliable means for insuring the continuous and copious lubrication of the bearings.

To the foregoing ends the invention resides in the construction and arrangement of the gearing hereinafter described as it is defined in the appended claims.

Figure 2:
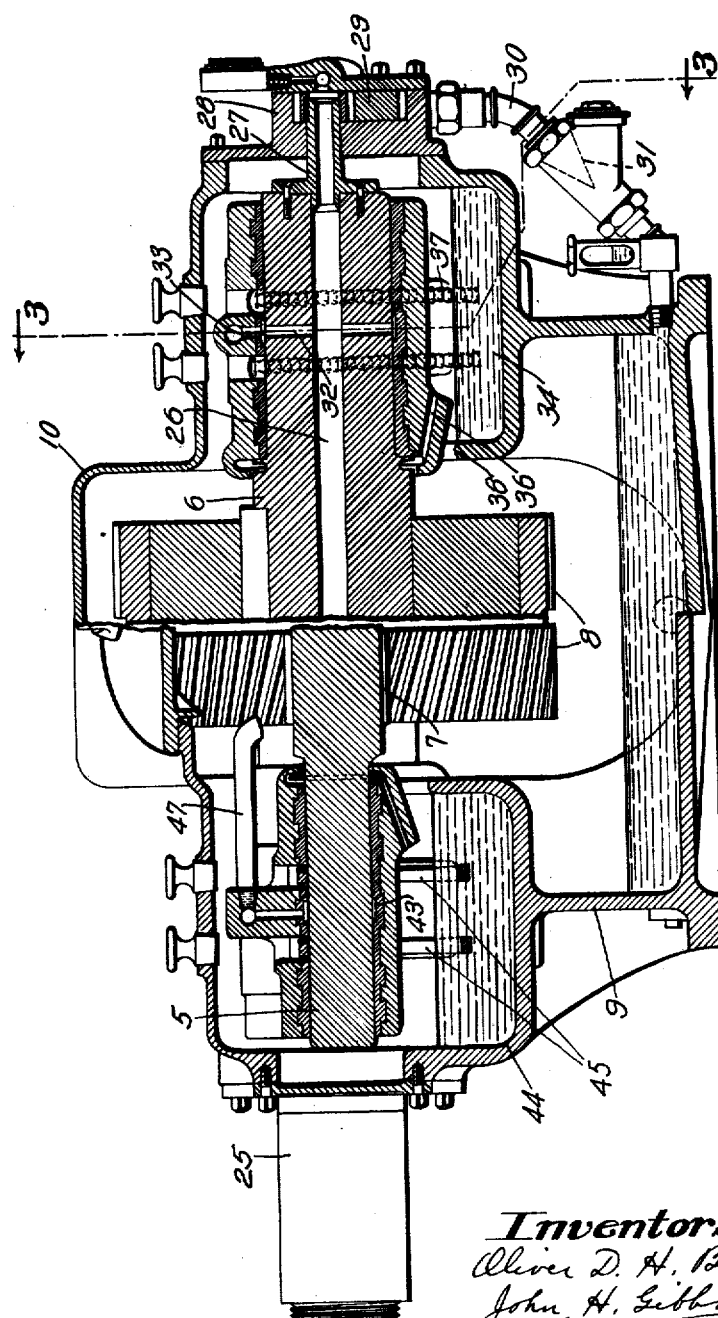

In the accompanying drawings, Figure 1 is a plan view of gearing embodying the present invention with the upper member of the gear-housing removed. Fig. 2 is a vertical section on the line 2—2 in Fig. 1; and Fig. 3 is a vertical section approximately on the line 3—3 in Fig. 2.

The invention is illustrated as embodied in gearing comprising a driving-shaft 5 and a driven-shaft 6, which are mounted in horizontal parallel positions. The driving-shaft carries a pair of herring-bone pinions 7 meshing with corresponding gears 8 which are keyed to the driven-shaft. The shafts are journaled and the gears inclosed within a housing comprising a lower member or body 9 and an upper member or cover 10, the two housing-members being divided in a horizontal plane of the axes of the shafts. The cover 10 is provided with a hand-hole, closed by a removable plate 11, to afford convenient access to the interior of the housing without removing the cover.

Figure 3:
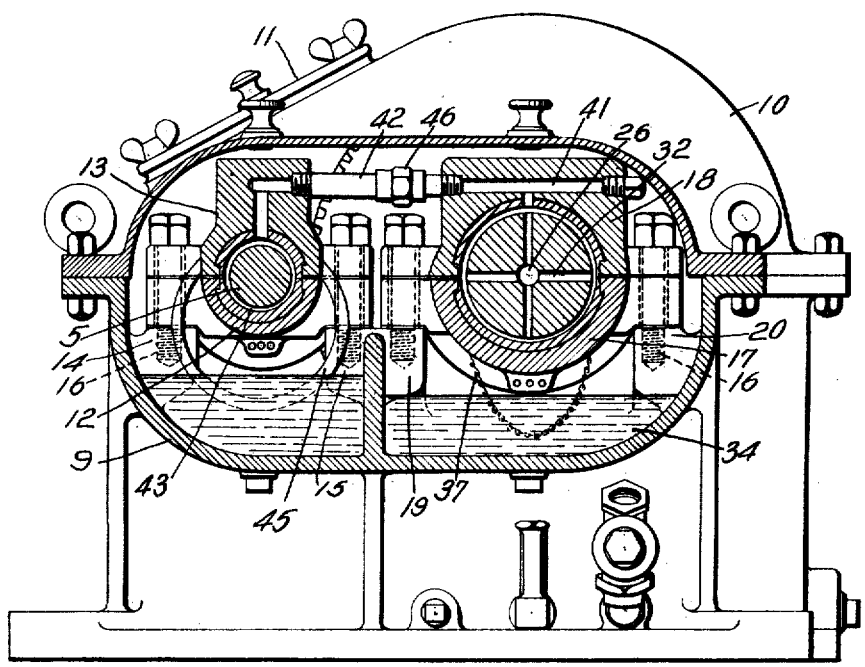

The construction by which provision is made for the adjustment hereinbefore referred to is shown particularly in Fig. 3. The driving-shaft 5 is mounted in two bearings, each of which comprises lower and upper members 12 and 13, respectively, these members being shown as lined with Babbitt metal or other suitable bearing material. The bearing is divided in the horizontal plane of the axis of the shaft and the two bearing members are provided with laterally-projecting lugs. These lugs in the case of the lower bearing member are supported upon seats 14, 15, formed integrally with the lower casing-member, while the lugs of the upper bearing-member are supported upon those of the lower-member. The driven shaft is supported in similar bearings comprising lower and upper members 17 and 18, the lower members being supported upon seats 19 and 20.

The bearing members are secured together and are also secured to their seats by means of stud-bolts 16 fixed in the seats and passing through openings in the bearing-lugs. Nuts upon the upper ends of the stud-bolts are employed in the usual manner to fix the parts together.

Provision for the lateral adjustment of the shafts is made by the use of openings in the bearing-lugs, which are greater in diameter than the stud-bolts 16, as shown by dotted lines in Fig. 3. Vertical adjustment of the bearings as a whole is provided for by the employment of removable and exchangeable shims between the lower bearing lugs and the seats. Adjustment of each bearing, to take up wear therein, is provided for by the use of removable and replaceable shims between the upper and lower bearing lugs.

It will be apparent that upon loosening the nuts upon the stud-bolts, and either removing or changing the shims or moving the bearings as a whole laterally upon their seats, the shafts can be brought into correct parallel position adjusted to the proper distance apart, and that consistently with these adjustments either shaft may be raised or lowered to a slight degree to facilitate its connection with the external mechanism by which it is driven or which it drives, and after such adjustment has been made, the parts may be locked securely in adjusted position by tightening the nuts upon the stud-bolts.

The housing is constructed so as to be oil-tight and to permit the use of considerable quantities of lubricating oil without permitting the escape thereof. Where the end 22 of the driving-shaft 5 projects from the housing, it is provided inside the wall of the housing with a centrifugal oil-guard 23 of ordinary form, and the shaft emerges through a centrally perforated plate 24 which is bolted to the end of the housing. The projecting end 25 of the driven shaft 6 is similarly arranged to prevent the escape of oil along the shaft. The driven shaft 6 is perforated longitudinally for the greater part of its length so as to provide a central oil-passage 26. This passage communicates with a hollow stem or conduit 27 which is fixed to the inner end of the shaft, as shown in Fig. 2. This stem fits closely in a bearing formed in a pump-casing 28 fixed to the end of the gear-housing. The pump-casing incloses gears 29 constituting members of a gear pump of ordinary form, and this pump communicates with the lower part of the gear-housing through an oil-pipe 30 provided with a strainer 31. The lower part of the housing constitutes a sump, in which a quantity of oil is placed and the pump acts normally to draw a constant supply of oil from this sump and forces it through the conduit 27 into the oil passage 26, from which it is distributed to the several bearings.

The bearings of the driven shaft 6 are supplied from the passage 26, through radial openings 32 in the shaft, these openings communicating with an annular passage 33 formed in each bearing. The oil traverses the bearings and the surplus escapes at the ends thereof. The oil so escaping is not, however, turned immediately into the oil-sump but is collected in an oil-pocket 34 formed in the gear-housing under each of the bearings 17, 18. In order to insure the collection of the oil in this pocket, each of the said bearings is provided at its inner end with an oil guard, which collects the oil and discharges it through a passage 36 into the pocket 34. The oil collects in the pocket to a depth regulated by the height of the inner loop 38 of the pocket, and after reaching this height, any surplus is discharged over the loop into the sump.

The oil in the pocket 34 is utilized in feeding the bearing by means of oil-chains 37. These chains are suspended upon the shaft 6 in a well known manner, so that they are moved continuously by the rotation of the shaft and these serve to raise the oil and apply it to the surface of the shaft.

The dual oil-system just described has the advantage that it insures against accidental failure of the supply of oil to the bearings. The pump normally supplies a considerable excess of oil to the bearings, but in case of the failure of the pump through clogging of the strainer or any other cause, the oil contained in the pockets 34 is sufficient in quantity to continue lubrication of bearings through the oil-chains for a considerable length of time. The same thing is true in case the oil supply of the sump is permitted to become exhausted. At the moment of such exhaustion the pockets 34 will be kept filled to their uttermost limit, so that they will provide for operation of the mechanism for a considerable period.

To provide for the lubrication of the driving-shaft 5 each of the bearings of the driven shaft is provided with a transverse passage 41 which is connected by a pipe 42 with an inlet passage in the upper member of the corresponding bearing of the driving-shaft 5. Accordingly part of the oil discharged under pressure into the annular passage 33 is conducted, through the passage 41 and the pipe 42, to an annular oil passage 43 in the driving-shaft bearing.

An oil pocket 44 is formed under each driving-shaft bearing and is employed for the same purpose as the pockets 34 under the driven shaft bearings. Owing to the high speed of rotation of the driving-shaft, oil rings 45 are provided in connection with this shaft instead of the chains employed in connection with the driven shaft. To accommodate the oil pipes 42 to the adjustments of the shaft which have been described, each oil pipe is provided with an adjustable joint or coupling 46.

In order to supply the teeth of the gear-wheels with a constant flow of lubricating oil, jet pipes 47 are connected with the oil passages in the bearings of the driving-shaft, as shown in Fig. 1, these jet-pipes being arranged to discharge constant streams of oil against the gear-teeth.

The invention is not limited to the embodiment thereof hereinbefore described and illustrated in the accompanying drawings, but it may be embodied in various other forms within the nature of the invention as it is defined in the following claims.

What is claimed is:

1. The combination with a housing having bearing-seats, of a horizontally-split bearing of which the lower member is supported by said seats; bolts passing loosely through both bearing-members and into said seats and serving both to secure the bearing-members together and to secure the bearing, as a whole, to the seats so as to permit adjustment of the bearing parallel with and transverse to the plane of the contacting faces of the bearing seats.

2. Gearing, having, in combination, a housing, bearing seats in the housing having plane faces, a pair of intermeshing gear wheels, a pair of shafts for supporting the gear wheels, bearings for the shafts having plane faces to contact with the plane faces of the bearing seats, and bolts passing loosely through the bearings and into the seats to secure the bearing members to the housing and to permit adjustment of the bearings parallel with and transverse to the plane of the contacting faces of the bearings and bearing seats.

3. Gearing, having, in combination, a pair of intermeshing double herringbone gear wheels, a pair of parallel shafts upon which the gear wheels are mounted, a housing comprising a base and a cover meeting substantially in the plane of the axes of the shafts, the base of the housing being provided with bearing seats, bearings for the shafts split in the plane of the axes of the shafts, and means for securing the bearings to the bearing seats, having provision for permitting adjustment of the bearings as a whole, both parallel with and transverse to the plane of the axes of the shafts.

OLIVER D. H. BENTLEY.
JOHN H. GIBBS.

Copies of this patent may be obtained for five cents each, by addressing the "Commissioner of Patents, Washington, D. C."